United States Patent
Suzuki (10) Patent No.: US 11,816,367 B2
(45) Date of Patent: Nov. 14, 2023

(54) METHOD FOR SETTING IMAGE PROCESSING APPARATUS, STORAGE MEDIUM, AND IMAGE PROCESSING SYSTEM

(71) Applicant: SEIKO EPSON CORPORATION, Tokyo (JP)

(72) Inventor: Atsushi Suzuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/445,320

(22) Filed: Aug. 18, 2021

(65) Prior Publication Data

US 2022/0057970 A1 Feb. 24, 2022

(30) Foreign Application Priority Data

Aug. 21, 2020 (JP) ................. 2020-140467

(51) Int. Cl.
| | | |
|---|---|---|
| *G06F 3/12* | (2006.01) | |
| *G06F 3/0481* | (2022.01) | |
| *G06F 3/0485* | (2022.01) | |

(52) U.S. Cl.
CPC .......... *G06F 3/1205* (2013.01); *G06F 3/0481* (2013.01); *G06F 3/0485* (2013.01); *G06F 3/1253* (2013.01); *G06F 3/1288* (2013.01)

(58) Field of Classification Search
CPC .... G06F 3/1205; G06F 3/0481; G06F 3/0485; G06F 3/1253; G06F 3/1288; G06F 3/1204; G06F 3/1229; G06F 9/451
See application file for complete search history.

(56) References Cited

U.S. PATENT DOCUMENTS

| | | | | |
|---|---|---|---|---|
| 6,721,879 | B1 * | 4/2004 | Tanaka | H04L 67/36 713/1 |
| 9,857,783 | B2 * | 1/2018 | Miwa | G06F 3/048 |
| 2015/0081050 | A1 * | 3/2015 | Miwa | G06F 9/453 700/83 |
| 2017/0019545 | A1 * | 1/2017 | Konji | H04N 1/00416 |
| 2017/0187897 | A1 * | 6/2017 | Shin | G06F 11/006 |
| 2020/0241814 | A1 * | 7/2020 | Kawaguchi | G06F 3/1225 |
| 2021/0055897 | A1 * | 2/2021 | Tomihisa | G06F 3/1204 |
| 2021/0133450 | A1 * | 5/2021 | Nakayama | G06T 11/00 |
| 2021/0165616 | A1 * | 6/2021 | Yasuda | G06F 3/1204 |
| 2021/0191672 | A1 * | 6/2021 | Saito | G06F 3/1272 |
| 2021/0218853 | A1 * | 7/2021 | Saeda | G06F 9/453 |
| 2021/0224009 | A1 * | 7/2021 | Kikuchi | G06F 3/1205 |
| 2021/0349667 | A1 * | 11/2021 | Soma | G06F 3/1205 |
| 2022/0027100 | A1 * | 1/2022 | Abe | G06F 3/1204 |
| 2022/0057970 | A1 * | 2/2022 | Suzuki | G06F 3/1253 |

FOREIGN PATENT DOCUMENTS

JP 2019-205116 A 11/2019

* cited by examiner

*Primary Examiner* — Helen Zong
(74) *Attorney, Agent, or Firm* — WORKMAN NYDEGGER (57) ABSTRACT

A method for setting a printer performs initial setup of the printer by using a setting image displayed on a terminal device. The method includes displaying, in a chat style in the setting image, a plurality of information logs regarding the initial setup of the printer, an instruction information log regarding instruction information including an instruction for a user who operates the printer, and a response log regarding a user response input by the user in response to the instruction information.

21 Claims, 7 Drawing Sheets

METHOD FOR SETTING IMAGE PROCESSING APPARATUS, STORAGE MEDIUM, AND IMAGE PROCESSING SYSTEM

The present application is based on, and claims priority from JP Application Serial Number 2020-140467, filed Aug. 21, 2020, the disclosure of which is hereby incorporated by reference herein in its entirety.

BACKGROUND

1. Technical Field

The present disclosure relates to a method for setting image processing apparatus, a storage medium, and an image processing system.

2. Related Art

A user interface that displays a chat-style screen as display of the display screen of a smartphone to allow the user to perform printing, multi-function printer registration, multi-function printer search, and the like has been presented (for example, see JP-A-2019-205116).

As described in JP-A-2019-205116, the technique of enhancing the convenience of the user for some of the setting operations for a multi-function printer has been presented. However, a method of further enhancing the convenience of the user when the user performs initial setup during installation of an image processing apparatus, such as a printing apparatus, has not been presented.

SUMMARY

An aspect of the present disclosure is a method for setting an image processing apparatus. The method performs initial setup of the image processing apparatus by using a setting image displayed on a terminal device. The method includes displaying, in a chat style in the setting image, a plurality of information logs regarding the initial setup of the image processing apparatus, an instruction information log regarding instruction information including an instruction for a user who operates the image processing apparatus, and a response log regarding a user response input by the user in response to the instruction information.

Another aspect of the present disclosure is a non-transitory computer-readable storage medium storing a program that, when executed by a terminal device that displays a setting image for initial setup of an image processing apparatus, causes the terminal device to perform a method. The method includes displaying, in a chat style in the setting image, a plurality of information logs regarding the initial setup of the image processing apparatus, an instruction information log regarding instruction information including an instruction for a user who operates the image processing apparatus, and a response log regarding a user response input by the user in response to the instruction information.

Still another aspect of the present disclosure is an image processing system including an image processing apparatus that processes image data, and a terminal device that performs initial setup of the image processing apparatus. The terminal device is configured to display a setting image for initial setup of the image processing apparatus, to display, in a chat style in the setting image, a plurality of information logs regarding initial setup of the image processing apparatus, an instruction information log regarding instruction information including an instruction for a user who operates the image processing apparatus, and a response log regarding a user response input by the user in response to the instruction information, to receive input of the user response, and, in response to the input of the user response, to transmit, to the image processing apparatus, setting information based on an instruction provided for the user response. The image processing apparatus is configured to receive the setting information from the terminal device and to set a function of the image processing apparatus based on the setting information.

DESCRIPTION OF EXEMPLARY EMBODIMENTS

1. Configuration of Printing System 100

Embodiments of the present disclosure will be described below with reference to the accompanying drawings.

Figure 1:
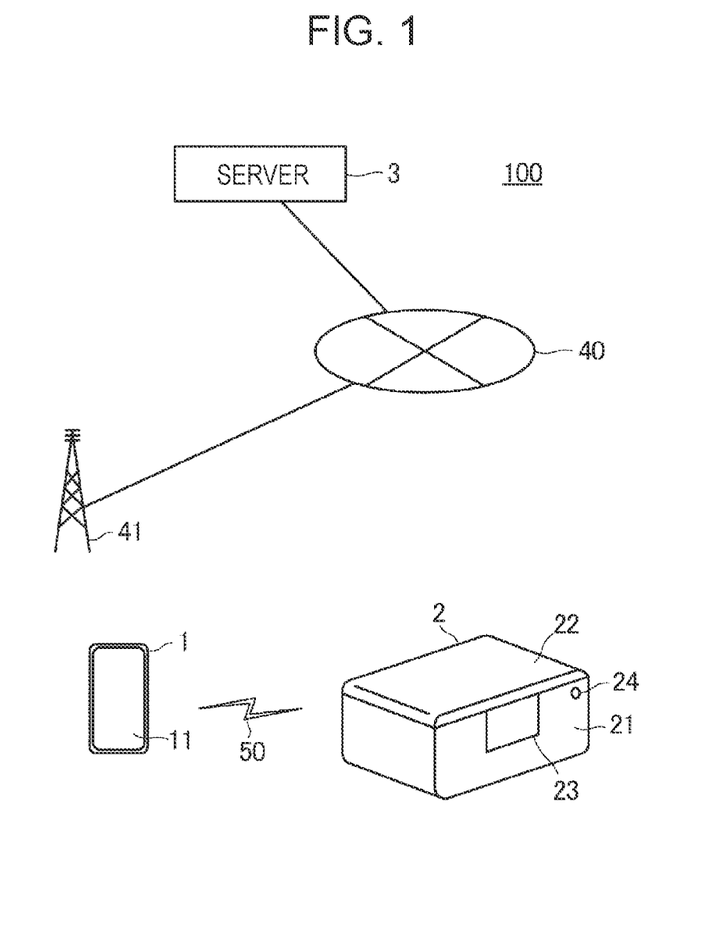
FIG. 1 is a diagram illustrating a schematic configuration of a printing system.

FIG. 1 is a diagram illustrating a schematic configuration of a printing system 100.

As illustrated in FIG. 1, the printing system 100 includes a terminal device 1 and a printer 2.

The printer 2 corresponds to an example of the image processing apparatus and the printing system 100 corresponds to an example of the image processing system.

The terminal device 1 is communicably connected to a server 3 via a communication network 40. The communication network 40 is composed, for example, of leased lines, a public network, and a mobile radio communication network and includes a local area network (LAN), and may be either a wide area network (WAN) or a local network. The communication network 40 may include various devices, such as a line switching device and a server. The connection of each of the terminal device 1 and the server 3 with the communication network 40 may be wireless or wired. In the configuration example illustrated in FIG. 1, the communication network 40 includes a base station 41 that constitutes the mobile radio communication network. The terminal device 1 is connected to the server 3 by performing wireless communication with the base station 41.

The terminal device 1 is a device that the user uses and is a mobile portable terminal. The terminal device 1 is a laptop computer, a tablet computer, a smartphone, or the like. The numbers of the terminal devices 1 and the printers 2 included in the printing system 100 are not limited, and a plurality of terminal devices 1 and a plurality of printers 2 may be used.

The terminal device 1 is connected to the printer 2 over a communication channel 50, which enables communication of data between the terminal device 1 and the printer 2. The communication channel 50 may be a wired data communication line or may be a wireless data communication line.

The terminal device 1 includes a touch panel 11. The touch panel 11 is a unit in which a display panel and a touch sensor are superposed on each other. Examples of the display panel of the touch panel 11 include a liquid crystal display panel and an organic electroluminescent (EL) panel. The touch sensor is a sensor that senses a contact operation of the user and locates the operating position. The touch sensor may be a capacitive sensor, may be a pressure-sensitive sensor, or may employ another sensing method. The touch panel 11 functions as a display device, which displays characters and images, and as an operating device, which detects an operation of the user for the terminal device 1. The touch panel 11 corresponds to an example of a display surface.

The terminal device 1 provides, to the user, a user interface for guiding the operations of the printer 2. The terminal device 1 provides a user interface with which the user performs initial setup to use the printer 2. The user interface is a chat-style interface that displays messages including characters and images in a conversational style on the touch panel 11.

The printer 2 is a printing device that prints an image on a printing medium. No restriction is imposed on the type of the printing medium, and examples of the printing medium include cut sheets of a certain size, roll paper, and sheets of synthetic resin. No restriction is imposed on the printing method of the printer 2, and printing methods of a dot impact type, a thermal sublimation type, a thermal type, and the like may be employed. In the present embodiment, the case where the printer 2 is an ink jet printing apparatus is described. The printer 2 includes an ink tank and a print head that discharges ink in a printer main body 21, and forms an image by discharging ink onto a printing surface of a printing medium.

The printer main body 21 of the printer 2 is provided with an openable and closable cover 22. The cover 22 is opened during an operation of replenishing an ink tank with ink. The printer main body 21 is provided with a display panel 23 that displays an operating state and the like of the printer 2. The display panel 23 may be a touch panel that detects a touch operation of the user. The printer main body 21 is provided with a power supply switch 24 for turning on or off the power supply of the printer 2.

Figure 2:
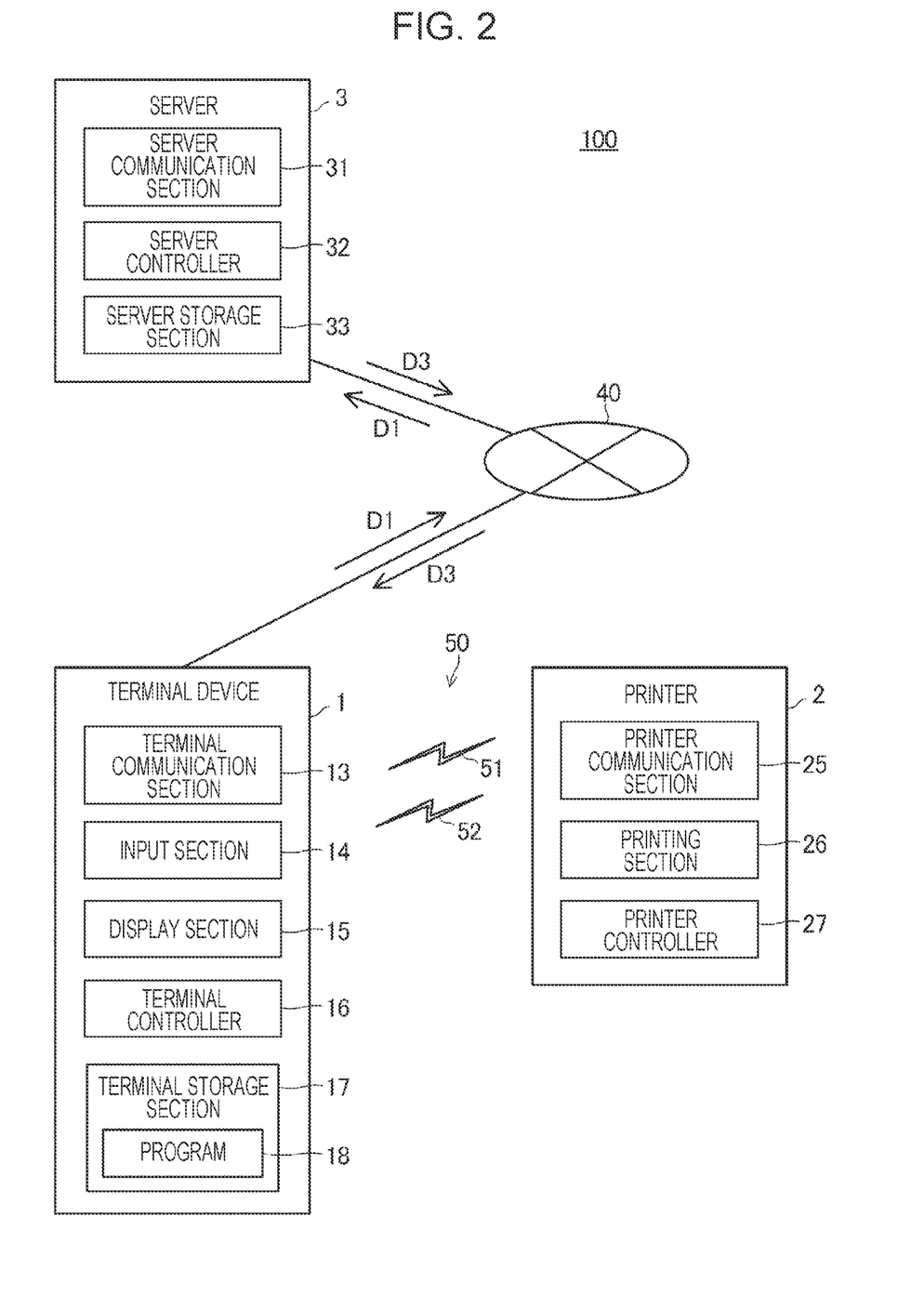
FIG. 2 is a functional block diagram of devices included in the printing system.

FIG. 2 is a functional block diagram of devices included in the printing system 100.

The terminal device 1 includes a terminal communication section 13, an input section 14, a display section 15, a terminal controller 16, and a terminal storage section 17.

The terminal communication section 13 is a communication interface that performs data communication. The terminal communication section 13, which includes a communication module that includes an antenna, a baseband circuit, a radio frequency (RF) circuit, a modem, and the like, is a wireless communication interface that performs communication with the base station 41.

The terminal communication section 13 has a function of performing data communication with the printer 2 over the communication channel 50. The communication channel 50 includes a first communication channel 51 and a second communication channel 52 consisting of wireless communication lines. The first communication channel 51 and the second communication channel 52 are each a wireless data communication line of Wi-Fi, Bluetooth, near field communication (NFC), or the like. The communication channel 50 includes the first communication channel 51 and the second communication channel 52 using different methods of communication, and uses a Bluetooth communication line for the first communication channel 51 and uses a Wi-Fi communication line via an access point for the second communication channel 52. The terminal communication section 13 includes a Bluetooth communication module that performs Bluetooth communication, and a Wi-Fi communication module that performs Wi-Fi communication. The first communication channel 51 may use Wi-Fi Direct. Wi-Fi and Bluetooth are registered trademarks.

The input section 14 receives user input by acquiring a detected value of a touch sensor of the touch panel 11. By using an operating position or an operation trajectory detected by the touch panel 11, the input section 14 determines the type of the user operation. The operating position refers to a touch position at which a finger or the like of the user touches the touch panel 11. Examples of the operation type include tapping and swiping. Tapping is an operation in which a finger of the user or the like is touching the touch panel 11 for a short time during which the touch position moves very little. Tapping may also be referred to as touching. Swiping is an operation of moving the touch position with a finger or the like of the user touching the touch panel 11.

The display section 15 is the touch panel 11 that displays images and characters. The display section 15 displays a chat-style user interface.

In the chat style, an alternate type of display and a consecutive type of display are provided. The chat style represents a display style in which, like conversation display, logs are displayed from one end and the other end of an axis perpendicular to the scroll direction of a display image displayed on the touch panel 11. Additionally, in the embodiment, display in which logs are displayed from both ends of a display image in one display screen is referred to as the alternate type of display, and display in which logs are displayed from one end of a display image on one display screen is referred to as the consecutive type of display.

The terminal controller 16 includes a processor, such as a central processing unit (CPU) or a microprocessor. The terminal controller 16 runs the program 18 stored in the terminal storage section 17 by the processor, controlling components of the terminal device 1. The terminal controller 16 may include a random-access memory (RAM) constituting a work area of the processor or may include other peripheral circuitry.

The terminal storage section 17 is a nonvolatile storage device made of a magnetic storage device, an optical storage medium, a semiconductor memory device, or the like. The terminal storage section 17 stores the program 18 executed by the processor of the terminal controller 16 and various types of data. The terminal storage section 17 may be a read-only memory (ROM) that is integrated into the terminal controller 16.

The program 18 is a control program that controls the terminal device 1. The program 18 includes an operating system that implements the basic functions of the terminal device 1. The operating system provides the communication functions performed by the terminal communication section 13, the functions of the input section 14, and the functions of the display section 15. The terminal controller 16 runs an operating system, providing a platform for executing application programs of the terminal device 1.

The terminal controller 16 controls the terminal communication section 13 to cause data communication with the printer 2 and data communication with the server 3 to be performed.

The program 18 includes a printing application program having a function of guiding the user through the procedure of initial setup of the printer 2 and a function of performing settings for the printer 2.

The terminal controller 16 executes the printing application program mentioned above to implement the following functions. The terminal controller 16 performs communication with the printer 2 by using the terminal communication section 13 to acquire information that identifies the model of the printer 2 and the manufacturer of the printer 2. The terminal controller 16 derives printer information D1 from the information acquired from the printer 2 and transmits the printer information D1 to the server 3. In accordance with the printer information D1, the server 3 transmits UI information D3 for providing a user interface that supports the printer 2, to the terminal device 1. Hereinbelow, UI is the abbreviation for the user interface.

The terminal controller 16 receives the UI information D3 from the server 3. In accordance with the UI information D3, the terminal controller 16 causes the touch panel 11, which is the display section 15, to display the user interface. When an operation on the touch panel 11 is detected by the input section 14 during display of the user interface, the terminal controller 16 causes the display of the user interface, which is displayed on the touch panel 11, to change in response to the detected operation. The terminal controller 16 acquires information about setting of the printer 2 in accordance with the operation detected by the input section 14, and performs settings for the printer 2 in accordance with the acquired information.

Before acquiring information identifying the model of the printer 2 and the manufacturer of the printer 2, the terminal controller 16 may display a user interface to start the initial setup of the printer 2. In this case, the terminal controller 16 acquires, from the display controller 17, information on a general-purpose user interface that supports a plurality of models of the printer 2, and executes a step of acquiring information about the models and the like of the printer 2.

The terminal controller 16 executes the printing application program that provides an instruction for printing to the printer 2 whose initial setup is complete.

The terminal controller 16 generates print data including data on characters and images to be printed on a printing medium, control data to specify printing conditions, a command that provides an instruction for printing, and the like and transmits the generated print data to the printer 2 using the function of the terminal communication section 13.

The printer 2 includes a printer communication section 25, a printing section 26, and a printer controller 27. The printer communication section 25 is a communication interface that performs data communication with the terminal device 1. In FIG. 2, the printer communication section 25 is a wireless communication interface including communication modules including an antenna, a baseband circuit, an RF circuit, a modem, and the like. The printer communication section 25 performs wireless communication over the first communication channel 51 and wireless communication over the second communication channel 52

The printing section 26 is a printing mechanism that prints an image on a printing medium. The printing section 26 includes a print head that discharges ink, and a transport mechanism that transports a printing medium. The printing section 26 may have a configuration including various types of sensors that detect the positions and sizes of printing media, a head scanning mechanism that scans the print head, and so on.

The printer controller 27 controls the printer communication section 25 to perform data communication with the terminal device 1. When receiving data about setting of the printer 2 from the terminal device 1, the printer controller 27 sets the printer 2 according to the received data.

When receiving print data from the terminal device 1, the printer controller 27 controls the printing section 26 according to the received print data, causing the printing section 26 to perform printing on a printing medium.

The server 3 includes a server communication section 31, a server controller 32, and a server storage section 33.

The server communication section 31 is a communication interface that performs data communication via the communication network 40.

The server controller 32 includes a processor, such as a CPU or a microcomputer, and controls each section of the server 3 when the processor executes a server control program. The server controller 32 may include a ROM storing, in a nonvolatile manner, a server control program for execution by the processor and/or a RAM constituting a work area for the processor, or may include other peripheral circuitry.

The server controller 32 controls the server communication section 31 to perform data communication with the terminal device 1. When receiving the printer information D1 transmitted from the terminal device 1, the server controller 32 identifies the model and manufacturer of the printer 2 by using the printer information D1. The server controller 32 generates the UI information D3 provided for the printer 2 or reads out the UI information D3 provided for the printer 2 stored in the memory, and transmits the UI information D3 to the terminal device 1. The UI information D3 is, as described later, a user interface image including data on display objects, such as characters and images, displayed by the terminal device 1, data specifying the display order and display positions of the display objects, and so on. The server 3 stores, in the server storage section 33, data for generating the UI information D3 provided for the functions and specifications of the printer 2.

The server storage section 33, which is a nonvolatile memory made of a magnetic storage device, an optical storage medium, a semiconductor memory device, or the like, stores a server control program for execution by the processor of the server controller 32 and various types of data.

In the description given above, when the terminal device 1 transmits the printer information D1 indicating the model and the like of the printer 2 to the server 3 once, the server 3 transmits the UI information D3 provided for the printer 2 to the terminal device 1 once. This is merely exemplary. The UI information D3 may be transmitted a plurality of different times from the server 3 to the terminal device 1. In accordance with the display progress of a user interface, the terminal device 1 transmits the printer information D1 to the server 3 once or a plurality of times. The terminal device 1 may include data about the progress state of the user interface in the printer information D1. The server 3 may receive the printer information D1 from the terminal device 1, generate new UI information D3 to support the progress of the user interface, and transmit the new UI information D3 to the terminal device 1.

2. Operations of Printing System 100

Figure 3:
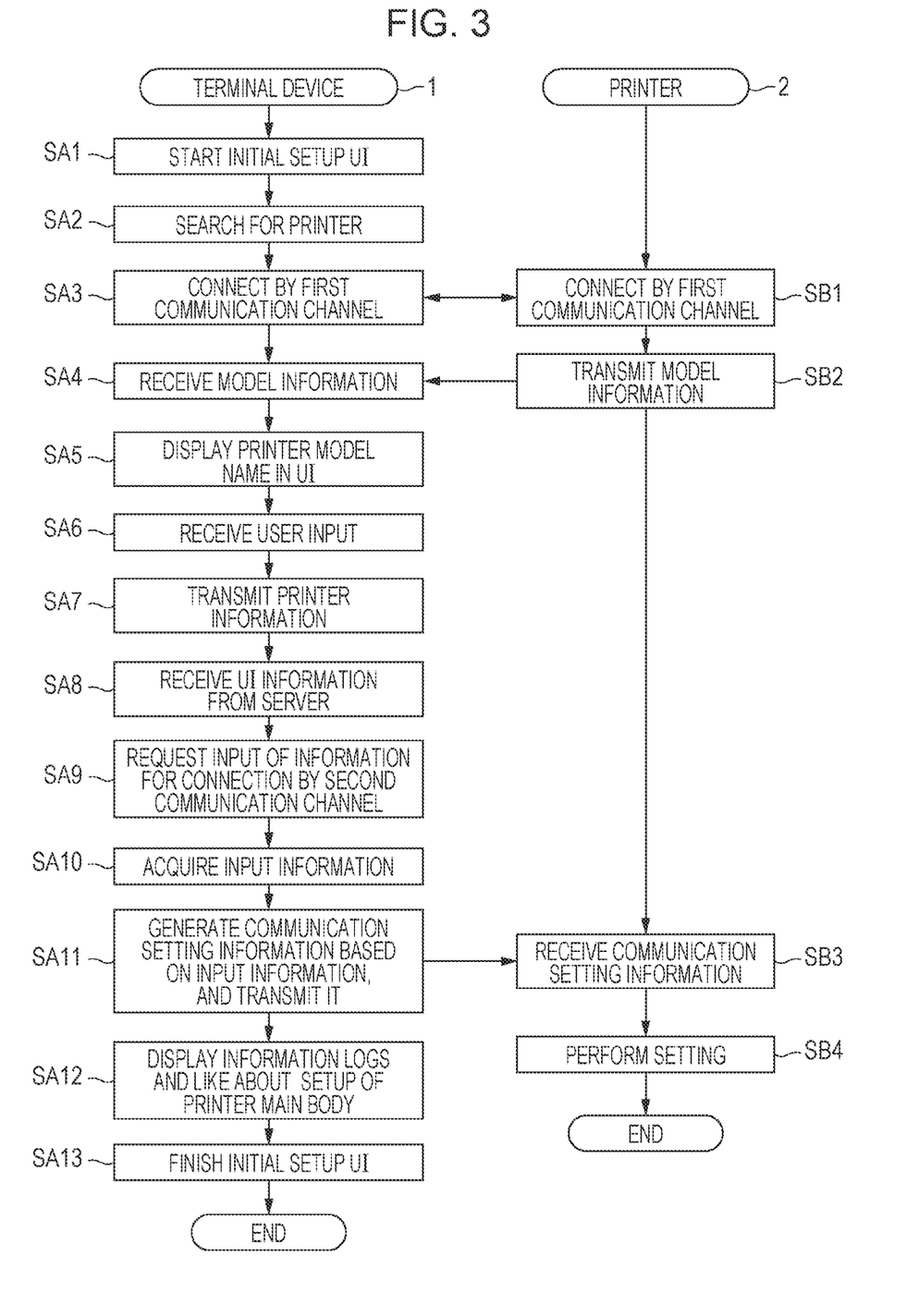
FIG. 3 is a sequence diagram illustrating operations of the printing system.

FIG. 3 is a sequence diagram illustrating some of the operations during initial setup of the printing system 100, illustrating operations of the terminal device 1 and operations of the printer 2. The operations illustrated in FIG. 3 are executed by the terminal controller 16 of the terminal device 1 and the printer controller 27 of the printer 2.

The printing system 100 displays an initial setup user interface 6 on the terminal device 1 to allow the user to perform initial setup of the printer 2. FIG. 3 illustrates operations during the initial setup using the initial setup user interface 6. The initial setup user interface 6 corresponds to an example of the setting image.

The terminal device 1 starts the initial setup user interface 6 to display a user interface screen on the touch panel 11 (step SA1). With the terminal communication section 13, the terminal device 1 searches for the printer 2 with which communication of Bluetooth used as the first communication channel may be performed (step SA2). If the terminal device 1 discovers the printer 2 as a result of searching in step SA2, the terminal communication section 13 and the printer communication section 25 of the printer 2 communicate with each other and are connected by the first communication channel 51 (steps SA3, SB1).

The printer 2 transmits model information, for example, in response to a request of the terminal device 1 (step SB2), and the terminal device 1 receives the model information from the printer 2 (step SA4). The model information includes at least one of the model of the printer 2, the manufacturer of the printer 2, and information identifying the specifications and the like of the printer 2. Prior to the operation of step SB2, the terminal device 1 may request the printer 2 to transmit the model information.

The terminal device 1 displays the model information received from the printer 2 by using the initial setup user interface 6 (step SA5) and receives user input via the touch panel 11 (step SA6). At this point, in accordance with the model information displayed on the touch panel 11, the user performs input of approving that a device for which initial setup is to be performed is the printer 2 having the model information displayed on the touch panel 11. Additionally, in step SA6, the user may perform input indicating that the initial setup is to be performed for a different device. In this case, the terminal device 1 may perform search again in step SA2.

The terminal device 1 generates the printer information D1 based on information acquired from the printer 2 and transmits the printer information D1 to the server 3 (step SA7). As described above, the server 3 transmits the UI information D3 provided for the printer information D1. The terminal device 1 receives the UI information D3 transmitted from the server 3 (step SA8).

The initial setup user interface 6 is a user interface for initial setup of the printer 2. The initial setup user interface 6 includes an instruction information log regarding characters and images that provide instruction and/or support for operations of the printer 2 to be performed by the user. The instruction information log includes icons, such as a display button, with which the user inputs information to be set for the printer 2. In steps SA1 to SA8, since the terminal device 1 does not receive the UI information D3 provided for the printer 2, the terminal device 1 executes a general-purpose initial setup user interface 6 capable of supporting a plurality of printers 2. After receiving the UI information D3 in step SA8, the terminal device 1 executes the initial setup user interface 6 based on the UI information D3.

In the example illustrated in FIG. 3, the terminal device 1 performs communication setting, which is one setting item among a plurality of setting items. The terminal device 1 requests the user to input, as one of the items of setting information, communication setting information about the second communication channel 52 of the printer 2 (step SA9). The communication setting information is information used for the terminal device 1 and the printer 2 to perform Wi-Fi communication via an access point, which is the second communication channel 52, and includes at least any of a personal identification number (PIN), the service set identifier (SSID) of an access point to which the terminal device 1 and the printer 2 are connected, information specifying whether the access point supports AirStation One-Touch Secure System (AOSS) or Wi-Fi Protected Setup (WPS), and the like. Additionally, the communication setting information may include information specifying whether the printer 2 is to perform communication over a wireless LAN or to perform communication over a wired LAN using Ethernet cables. Ethernet and AOSS are registered trademarks.

After step SA12 and step SB4, the terminal device 1 and the printer 2 are connected by the second communication channel 52.

Then, the terminal device 1 displays information logs and the like about the setup of the main body of the printer 2 by means of the initial setup user interface 6 (step SA12). In step SA12, by means of the initial setup user interface 6, the terminal device 1 displays information about the setting operations for the main body of the printer 2 and about various operations for staring to use the printer 2. The setting operations and various operations include at least one of an operation of removing a protection tape attached to the printer 2, an operation of attaching an option unit, an attachment operation and an ink filling operation of an ink cartridge, an operation of loading paper sheets as a printing medium, an operation of installing the printer 2, and the like. In response to completion of providing information for initial setup of the printer 2, the terminal device 1 finishes the initial setup user interface 6 (step SA13).

In this way, the initial setup process of the printer 2 performed by the terminal device 1 using the user interface 6 includes a plurality of setting steps mentioned above for the communication functions of the printer 2. The initial setup user interface 6 includes the content about initial setup of the printer 2 other than the setting steps for the communication functions. This enables various types of information about the initial setup of the printer 2 to be presented to the user by using the initial setup user interface 6. As a result, the user may easily perform setting.

3. Display Example of User Interface

Figure 4:
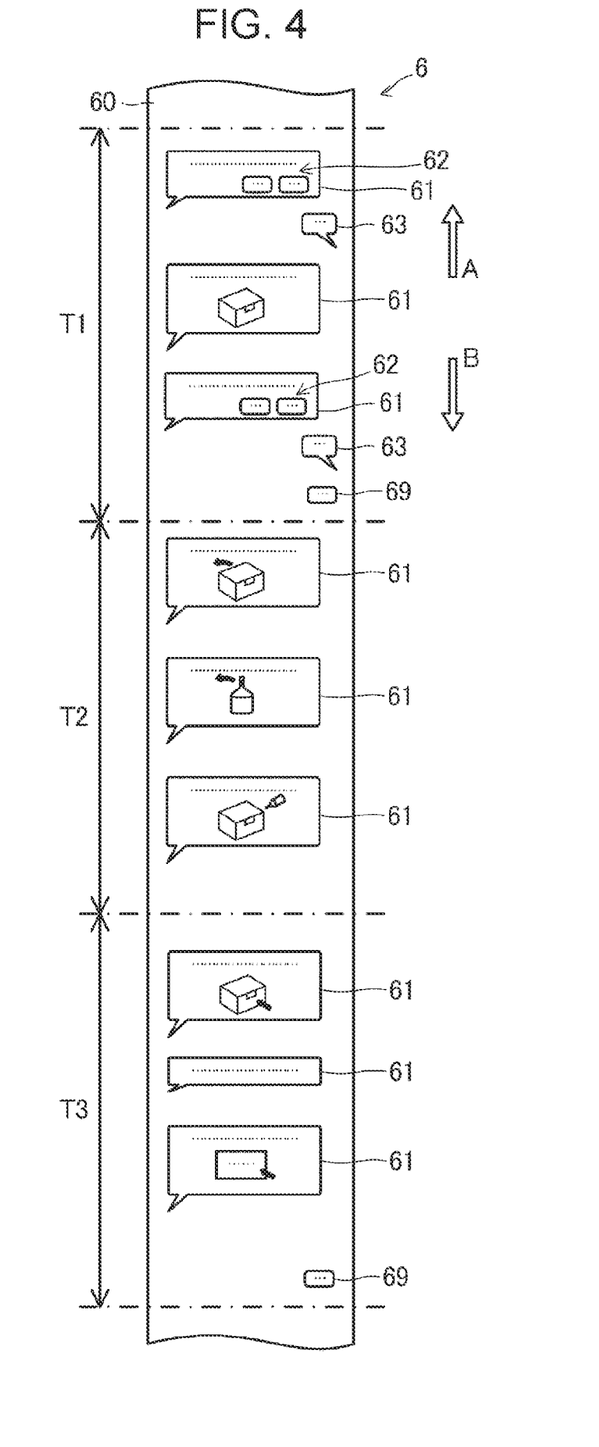
FIG. 4 is a diagram illustrating an example of a user interface of a terminal device.
Figure 5:
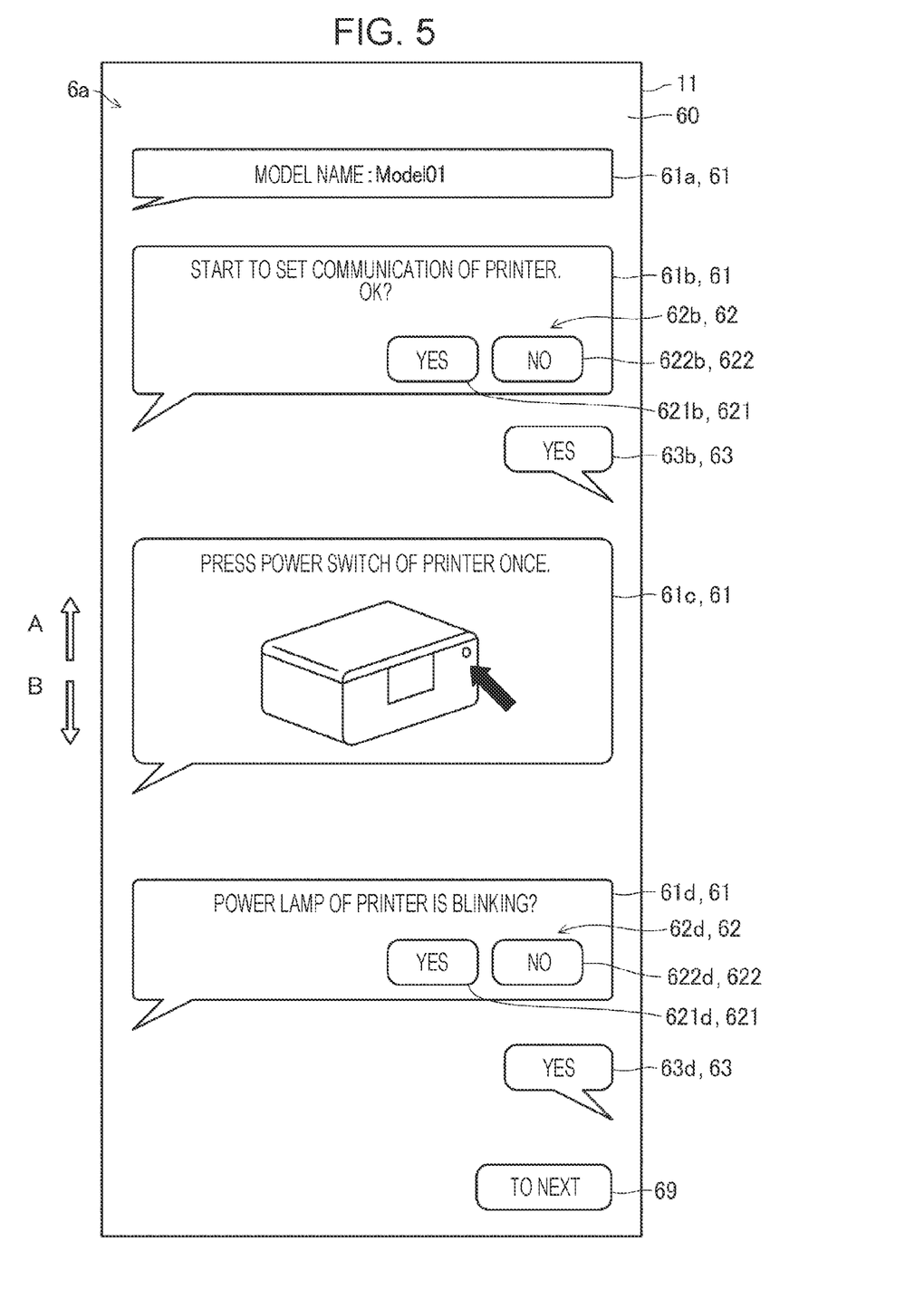
FIG. 5 is a diagram illustrating a display example of the terminal device.
Figure 6:
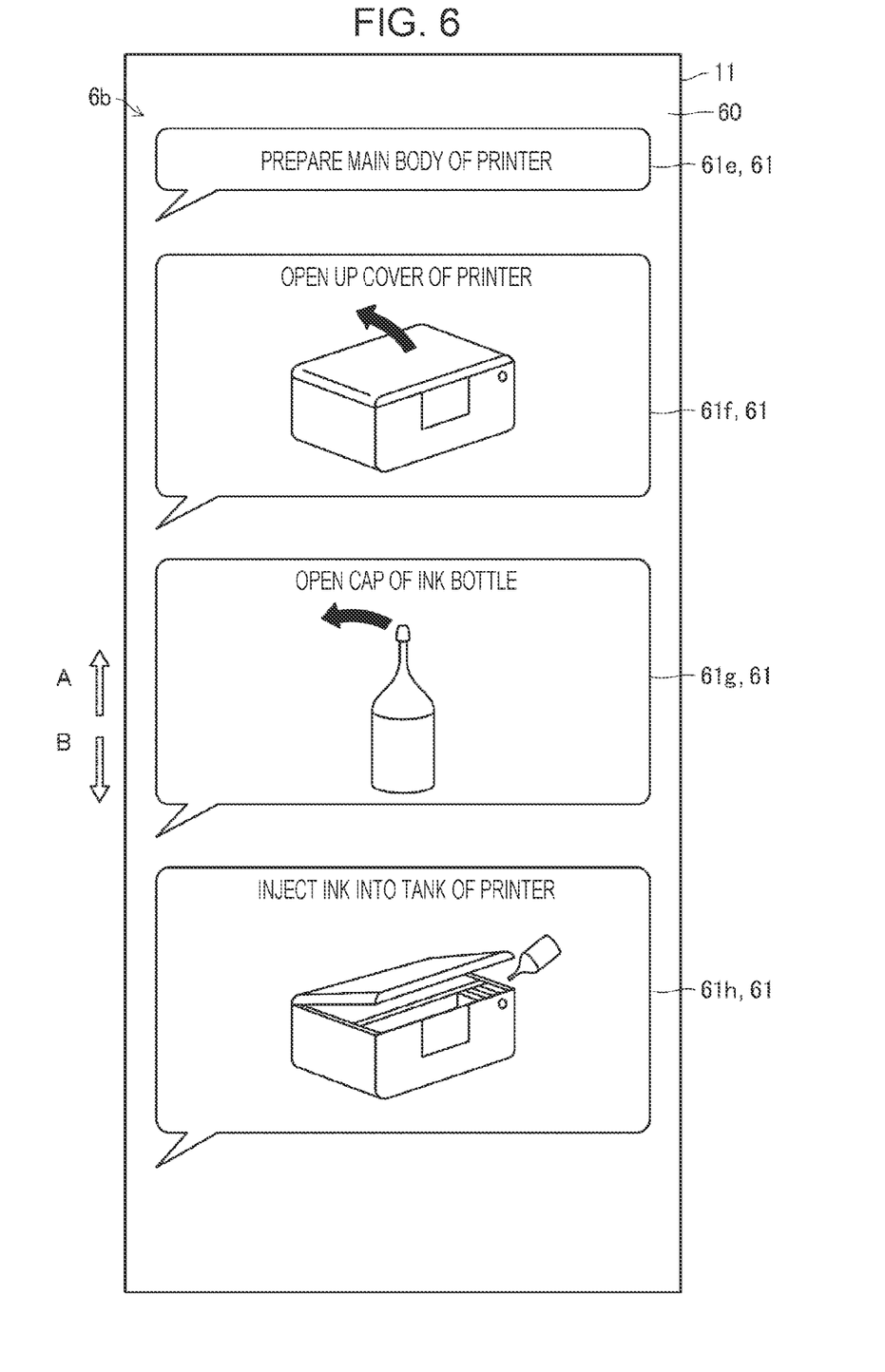
FIG. 6 is a diagram illustrating another display example of the terminal device.

FIG. 4, FIG. 5, and FIG. 6 illustrate display examples of the initial setup user interface 6 provided by the terminal device 1.

FIG. 4 illustrates an example of the initial setup user interface 6 that the terminal device 1 displays on the touch panel 11. The configuration illustrated in FIG. 4 is part of the initial setup user interface 6 described with reference to FIG. 3.

The initial setup user interface 6 includes a UI background section 60 and pluralities of device logs 61 and user logs 63 arranged in the UI background section 60. The device log 61 includes an information log and an instruction information log. The user log 63 corresponds to a response log. The UI background section 60 is a virtual area that is not limited by the size of the display area of the touch panel 11. The UI background section 60 is larger than the touch panel 11 in an A direction and a B direction corresponding to the vertical axis of the touch panel 11. The display image of the initial setup user interface 6 is scrolled in the A direction and in the B direction.

The device log 61 and the user log 63 are display objects displayed in the UI background section 60 and includes characters and images. The device log 61 and the user log 63 may translate into a message and a comment. The device log 61 and the user log 63 are arranged in a row in a direction that the display image of the initial setup user interface 6 is scrolled. The device log 61 corresponds to an instruction about initial setup.

The device log 61 is a message from the terminal device 1 to the user and includes an information log regarding information presented to the user. The device log 61 includes characters and/or images. The user log 63 is a message based on the content input by the user, and is displayed in response to an input operation of the user to the terminal device 1. The device log 61 includes information regarding the initial setup of the printer 2. The information log includes information for use as initial setup of the printer 2 and information specifying the work. The device log 61, including an instruction for the user, corresponds to an example of the instruction information log regarding instruction information. The user log 63 corresponds to an example of a response log regarding a user response.

At least some of the device logs 61 are instruction information logs including the input request images 62. The input request image 62 is an image corresponding to a response request to the user and includes options 621 and 622 described later that are selectable by the user. The user performs input by selecting one of the options 621 and 622 through tapping. For example, the option 621 corresponds to the first option and the option 622 corresponds to the second option.

The content of an operation performed by the user for the input request image 62 is displayed as a response of the user in the user log 63. In the input request image 62, characters may be used to request a response.

In the initial setup user interface 6, the device log 61 and the user log 63 are displayed, by the terminal device 1, in a chat style in which the device logs 61 and the user logs 63 are arranged in a manner resembling a conversation. The device log 61 is displayed at a position offset to the left, which is one direction perpendicular to the scroll direction of the UI background section 60, and the user log 63 is displayed at a position offset to the right, which is the other direction perpendicular to the scroll direction of the UI background section 60. Thereby, a conversation between the terminal device 1 and the user is presented.

The terminal device 1 provides a consecutive type of display in which a plurality of information logs are consecutively presented to the user in a state in which no input operation is performed by the user. The terminal device 1 displays a plurality of device logs 61 simultaneously or consecutively.

FIG. 4 illustrates areas that may be displayed simultaneously on the touch panel 11, as segments T1, T2, and T3. Each of the segments T1, T2, and T3 is an area in which a range displayable on one screen of the touch panel 11 is cut out from the initial setup user interface 6.

The initial setup user interface 6 is displayed with the alternate type of display in the segment T1 illustrated in FIG. 4 and with the consecutive type of display in the segment T2 and the segment T3. For the segments T1 and T2, switching is performed between the alternate type of display and the consecutive type of display. However, the boundary of display in the initial setup user interface 6 is not limited by the size of the touch panel 11. That is, the display in the initial setup user interface 6 may be changed at positions different from the boundaries between the segments T1, T2, and T3.

The terminal device 1 scrolls the display of the initial setup user interface 6 in the A direction and in the B direction, which is opposite to the A direction, in response to user operations. From a state where the segment T3 is displayed on the touch panel 11, the terminal device 1 allows the display to be scrolled up to the segment T1 by a user operation. Examples of the user operation in this case, that is, scrolling, include an operation of swiping a finger of the user in the B direction. In response to the scrolling, the terminal device 1 may switch an area displayed on the touch panel 11 in the units of the segments T1, T2, and T3, or may display any portion of the UI background section 60 on the touch panel 11, regardless of boundaries between the segments T1, T2, and T3. The A direction corresponds to the first direction and the B direction corresponds to the second direction.

At ends of the segments T1 and T3, operation images 69 are arranged. The operation image 69, which is a display object operated by the user, is operated when the user provides an instruction from the segment T1 or the segment T3 to the next segment. When the operation image 69 is operated during display of the segment T1, the terminal device 1 moves the display from the segment T1 to the next segment T2. At this point, the terminal device 1 may display the entirety of the segment T2 on the touch panel 11 or may display an area extending across the segment T1 and the segment T2 on the touch panel 11. That is, in response to an operation on the operation image 69, the terminal device 1 may switch the segment T1 on a per-segment basis or may switch the terminal T1 at a position different from the boundaries between the segments T1, T2, and T3. The terminal device 1 switches an area displayed on the touch panel 11 in response to an operation on the operation image 69.

FIG. 5 is a diagram illustrating a display example of the terminal device 1, illustrating an example in which the segment T1 of the initial setup user interface 6 is displayed on the touch panel 11.

In the segment T1, the device logs 61 and the user logs 63 are arranged in the alternate type. The terminal device 1 displays a user interface 6a in the segment T1, which is part of the chat-style initial setup user interface 6, on the touch panel 11.

The user interface 6a includes pluralities of device logs 61 and user logs 63, and the device logs 61 are displayed at preset intervals. Four device logs 61 included in the user interface 6a illustrated in FIG. 5 are referred to as individual device logs 61a, 61b, 61c, and 61d. Each of the individual device logs 61a, 61b, 61c, and 61d represents an individual log included in the plurality of device logs 61. Two user logs 63 included in the user interface 6a are assumed as the individual user logs 63b and 63d. The individual user logs 63b and 63d are response logs and represent individual logs included in the plurality of user logs 63.

At the time of starting display of the user interface 6a, the device log 61 and the user log 63 are not displayed in the UI background section 60. After a certain period of time from the start of display, the terminal device 1 displays the individual log 61a. The individual log 61a corresponds to an information log. Subsequently, the terminal device 1 displays the individual device log 61b. The individual device log 61b is an instruction information log including an input request image 62b to be operated by the user. The input request image 62*b* includes options 621*b* and 622*b*. The options 621*b* and 622*b* are used when the user inputs a response to the content of the individual device log 61*b*. The user performs an operation of selecting either the options 621*b* or the option 622*b*, thereby inputting a response regarding whether the setting of the printer 2 may be initiated or not. The option 621*b* corresponds to the input of the answer "Yes", and the option 622*b* correspond to the input of the answer "No".

When detecting that user has tapped the display position of either the option 621*b* or the option 622*b*, the terminal device 1 receives input corresponding to the operated option 621*b* or 622*b* and displays, as a response based on the input, the individual user log 63*b* corresponding to a response log. When the option 621*b* is tapped, the individual user log 63*b* indicating the answer "Yes" is displayed.

The input request image 62 may have a configuration without the options 621*b* and 622*b*. The configuration in which the user may selectively input either the option 621*b* or the option 622*b* arranged in the input request image 62*b* is exemplary, and the input request image 62 may have an input area for entering characters.

In response to an operation of the option 621*b*, the terminal device 1 displays the individual device log 61*c*. The individual device log 61*c* is displayed on the touch panel 11 in response to tapping of the user. At this point, the individual device logs 61*a* and 61*b* and the individual user log 63*b* move in the A direction, which is the first direction. Tapping is an example of the second operation. The individual device log 61*c* is an example of an information log including characters and an image with which an operation to be performed for the printer 2 by the user is explained to the user. Subsequently, during display of the individual device log 61*c*, the terminal device 1 moves the individual device logs 61*a*, 61*b*, and 61*c* and the individual user log 63*b* in the A direction through scrolling of the user to display the individual device log 61*d*. Scrolling is an example of the first operation. The individual device log 61*d* is an instruction information log including an input request image 62*d*. Options 621*d* and 622*d* constituting the input request image 62*d* are displayed in the individual device log 61*d*. The option 621*d* corresponds to input of the answer "Yes", and the option 622*d* corresponds to input of the answer "No".

When detecting tapping at the display position of either the option 621*d* or the option 622*d*, the terminal device 1 receives the tapped option as response input of the user. If the option 621*d* is tapped, the individual user log 63*d* is displayed in accordance with the response of the user. Depending on an option selected by the user, the content of the display log 61 displayed subsequently to the selected option by the terminal device 1 may vary. The terminal device 1 displays an instruction to the user, which differs depending on whether the user selects the option 621*d* or the option 622*d*. Each time the terminal device 1 acquires a response of the user, the terminal device 1 may acquire the content of the individual device log 61 provided for the response from the UI information D3.

FIG. 6 is a diagram illustrating another display example of the terminal device 1, illustrating an example in which the segment T2 of the initial setup user interface 6 is displayed on the touch panel 11.

In the segment T2, the individual device logs 61*e*, 61*f*, 61*g*, and 61*h* corresponding to information logs are arranged with the consecutive type of display. In the segment T2, the terminal device 1 displays portions with the consecutive type of display in the user interface 6*b*. The terminal device 1 may display the individual device logs 61*e*, 61*f*, 61*g*, and 61*h* one by one in response to scrolling of the user, or may display the individual device logs 61*e*, 61*f*, 61*g*, and 61*h* simultaneously.

The individual device logs 61*e*, 61*f*, 61*g*, and 61*h* are information logs including information that explains, to the user, operations for the printer 2 to be performed by the user. Each of the individual device logs 61*e*, 61*f*, 61*g*, and 61*h* corresponds to one operation to be performed by the user. This enables the operations to be explained to the user step by step in an understandable way, and thus it may be expected that the user will perform operations without feeling resistance.

The user operates the printer 2 while viewing each of the individual device logs 61*e*, 61*f*, 61*g*, and 61*h*. In response to swiping, the terminal device 1 scrolls the display area of the user interface 6*b* in the A direction and in the B direction. The range in which the display is scrolled is not restricted by the boundary between the segments T1 and T2, and therefore the display area of the initial setup user interface 6 may be scrolled from the segment T2 to the beginning of the segment T1. Therefore, the user may view the display area of the initial setup user interface 6 at an arbitrary position.

In this way, the terminal device 1 causes the display appearance in the initial setup user interface 6 to differ depending on the type of information presented to the user. When proceeding with an interactive process with the user in order for the user to perform confirmation, information input, and so on, the terminal device 1 displays an area, such as the user interface 6*a*, where the alternative type of display appears. In contrast, when user input is unnecessary, the terminal device 1 displays an area, such as the user interface 6*b*, where the consecutive type of display, which is suitable for presentation of information, appears.

FIGS. 4 to 6 illustrate the case where the segment T1 constitutes the user interface 6*a* with the alternate type of display and the segment T2 constitutes the user interface 6*b* with the consecutive type of display. However, this is merely exemplary. As described above, the borders between the alternate type of display and the consecutive type of display are not limited by the boundaries between the segments T1, T2, and T3.

The UI information D3 includes information of the device logs 61 and the user logs 63 displayed in the initial setup user interface 6 and information of the operation images 69. The information of the device logs 61 and the user logs 63 include data on characters and images arranged in the device log 61, the display order of the device logs 61, the presence or absence of the input request image 62 associated with the device log 61, the content of the input request image 62, and information indicating the time interval at which the device log 61 is displayed. The information of the operation image 69 includes information specifying the display position of the operation image 69 in the initial setup user interface 6.

The UI information D3 may be information including information specifying the type of display in the initial setup user interface 6. That is, the UI information D3 may include information specifying whether the type of display in the initial setup user interface 6 is the alternate type or the consecutive type, and information specifying the border between both types of display. In this case, using the type of display specified by the UI information D3, the terminal device 1 may display the device logs 61, the user logs 63, and the operation images 69 in the UI background section 60.

In addition, the terminal device 1 displays the device logs 61 and the user logs 63 according to the UI information D3, the result of which may be such that a portion or the entirety of the initial setup user interface 6 is provided with the alternate type of display and the other portions are provided with the consecutive type of display. In this case, even if the terminal device 1 does not perform control of switching between the display types, the initial setup user interface 6 with the alternate type of display and/or the consecutive type of display is provided in accordance with the content.

4. Display of User Interface

Figure 7:
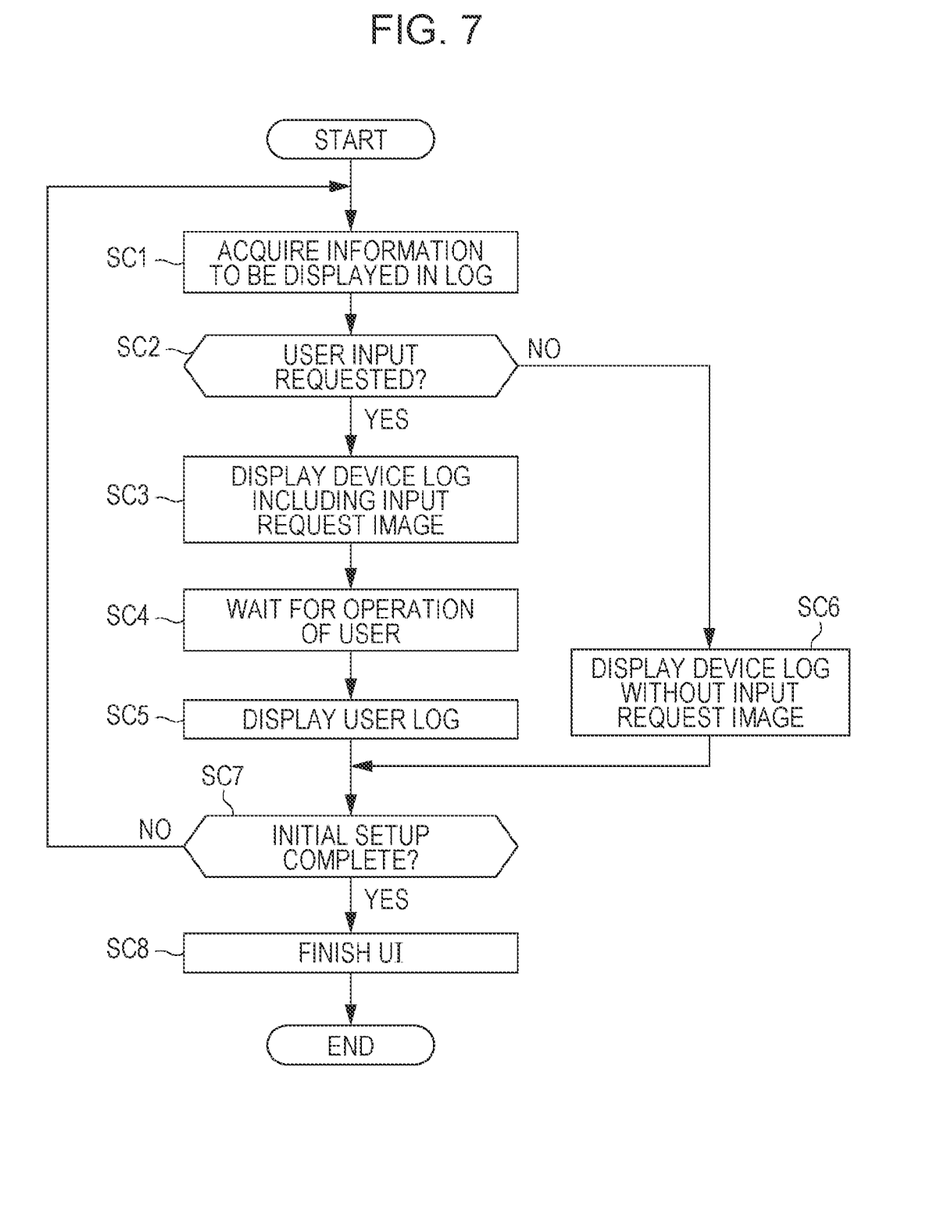
FIG. 7 is a flowchart illustrating operations of the terminal device.

FIG. 7 is a flowchart illustrating operations of the terminal device 1, illustrating operations about display of the device logs 61 and the user logs 63 in the initial setup user interface 6. The operations illustrated in FIG. 7 are executed by the terminal controller 16.

The terminal device 1 acquires information about the device log 61 in the initial setup user interface 6 (step SC1) and determines whether the device log 61 requests user input (step SC2). If the user input is requested for the device log 61 about which information is acquired in step SC1 (Yes in step SC2), the terminal device 1 displays the device log 61 including the input request image 62 (step SC3).

The terminal device 1 waits for an input operation from the user by using the input request image 62 (step SC4). When the user operation using the input request image 62 is performed, the terminal device 1 displays the user log 63 in accordance with the user operation (step SC5) and proceeds to step SC7.

Alternatively, if the user input is not requested for the device log 61 about which information is acquired in step SC1 (No in step SC2), the terminal device 1 displays the device log 61 that does not include the input request image 62 (step SC6) and proceeds to step SC7.

In step SC7, the terminal device 1 determines whether setting with the initial setup user interface 6 is complete (step SC7). For example, if the initial setup user interface 6 is displayed completely and the initial setup of the printer 2 is completed, the terminal device 1 determines affirmatively that the setting is complete (Yes in step SC7). In this case, the terminal device 1 finishes the initial setup user interfaces 6 (step SC8).

If the initial setup of the printer 2 with the initial setup user interface 6 is not completed (No in step SC7), the terminal device 1 returns to step SC1 where the terminal device 1 displays the next device log 61.

In the operations in FIG. 7, in the case of displaying the device log 61 that requests user input, the terminal device 1 alternately displays the device log 61 and the user log 63 that supports an operation to the input request image 62. The terminal device 1 also displays the device logs 61 that do not request user input, sequentially on the touch panel 11. When a plurality of device logs 61 that do not request user input are consecutively displayed, the user interface 6b is displayed with the consecutive type of display on the touch panel 11 as illustrated in FIG. 6. The terminal device 1 may display the plurality of device logs 61 simultaneously or may display one or more device logs 61 in response to scrolling of the user.

During the operations illustrated in FIG. 7, the terminal device 1 may receive an operation of instructing the terminal device 1 to perform scrolling. When receiving swiping, for example, after displaying the device log 61 or after displaying the user log 63, the terminal device 1 scrolls through the display area of the initial setup user interface 6.

5. Advantageous Effects of Embodiment

As described above, the method for setting the printer 2 performs initial setup of the printer 2 by using the initial setup user interface 6 displayed on the terminal device 1, and thus the method uses the initial setup user interface 6. In the method, information logs regarding initial setup of the printer 2, instruction information logs regarding instruction information including instructions for the user who operates the printer 2, and response logs regarding user responses input by the user in response to the instruction information are displayed as pluralities of device logs 61 and user logs 63 in a chat style in the initial setup user interface 6.

The program 18 according to the present embodiment is executed by the terminal device 1 that displays the initial setup user interface 6 for initial setup of the printer 2. The program 18 causes a plurality of device logs 61 to be displayed in a chat style in the initial setup user interface 6. The plurality of device logs 61 displayed in the chat style are information logs regarding the initial setup of the printer 2, instruction information logs regarding instruction information including instructions for the user who operates the printer 2, and response logs regarding user responses input by the user in response to instruction information.

The printing system 100 includes the printer 2, which processes image data, and the terminal device 1, which performs initial setup of the printer 2. The terminal device 1 displays the initial setup user interface 6 for initial setup of the printer 2. The terminal device 1 displays, in a chat style in the initial setup user interface 6, information logs regarding the initial setup of the printer 2, instruction information logs regarding instruction information including an instruction for the user who operates the printer 2, and response logs regarding user responses input by the user in response to instruction information. The terminal device 1 receives input of a user response and, in response to the input of the user response, transmits, to the printer 2, setting information based on an instruction provided for the user response. The printer 2 receives setting information from the terminal device 1 and sets the function of the printer 2 based on the setting information.

According to the method for setting the printer 2 performed by the terminal device 1, the program executed by the terminal device 1, and the printing system 100, when the initial setup is performed during installation of the printer 2, not only instruction information logs regarding input instructions but also information logs regarding operations to devices for ink injection and the like are displayed. This enables the user to perform initial setup without separately checking the manual. The convenience of the user may be enhanced by using the terminal device 1.

The terminal device 1 receives an operation performed by the user. In response to receiving the first operation while displaying an information log arranged in the initial setup user interface 6, the terminal device 1 provides display in which the information log moves in the first direction. In response to receiving the second operation while displaying the device log 61 as an instruction information log, the terminal device 1 provides display in which the device log 61 as the instruction information log moves in the first direction.

The program 18 described above causes the terminal device 1 to receive an operation performed by the user. In response to receiving the first operation while displaying an information log regarding the initial setup arranged in the initial setup user interface 6, the terminal device is caused to provide display in which the information log moves in the first direction. The program 18 causes the terminal device 1 to perform, in response to receiving the second operation while displaying the device log 61 as the instruction information log, providing display in which the device log 61 as the instruction information log moves in the first direction.

In the above description, the first operation is swiping or scrolling in the A direction or in the B direction. The second operation is tapping the option 621 or 622 of the input request image 62.

According to the program 18 and the setting method implemented by the program 18, input of information performed by the user is received while the initial setup user interface 6 is being displayed, and the initial setup user interface 6 is scrolled in response to an operation of the user. Therefore, for the initial setup of the printer 2, the user may easily input information and view instructions issued to the user.

The terminal device 1 displays information logs regarding initial setup by means of the initial setup user interface 6. The device log 61 regarding initial setup includes characters and/or images.

The device log 61, which is information regarding initial setup, includes information regarding work that the user performs for the printer 2 when installing the printer 2.

In such a manner, the terminal device 1 may provide information about the initial setup of the printer 2 in an understandable way to the user by displaying the initial setup user interface 6. The user may easily recognize operations to be performed for the printer 2 by referencing characters and images of the device log 61.

The instruction information log includes the input request log 62 as a response request including a plurality of options. When, after displaying the input request image 62, the terminal device 1 receives an operation of selecting either the option 621 or the option 622, the terminal device 1 displays the user log 63 in accordance with the selected option. According to this method, the content of an operation performed in response to the input request image 62 by the user may be displayed as a response to the device log 61 in the user interface 6. This enables the response of the user to be presented to the user in an understandable way. The user may view simultaneously both the response given by the user and the device long 61 and may easily understand the operation for the initial setup of the printer 2.

6. Other Embodiments

The present disclosure is not limited to the embodiment described above and may be carried out in various manners without departing from the spirit and scope thereof.

In the embodiment described above, while displaying the initial setup user interface 6, the terminal device 1 detects swiping of the user and scrolls the display. The case where the first operation of giving an instruction for scrolling is swiping is illustrated. The first operation may be, for example, pinching that is an operation of contacting the touch panel 11 at a plurality of operating positions, a gesture of moving the contact position on the touch panel 11 in a predetermined manner, or an operation of moving the terminal device 1. The second operation is not limited to tapping and may be a character input operation. The terminal device 1 may arrange a character input box as the input request image 62 at a position corresponding to the position of the device log 61. The first operation and/or the second operation may be a sound operation.

The setting steps of the printer 2 performed by the terminal device 1 by using the initial setup user interface 6 is, as described above, not limited to communication setting of the printer 2 and the setting of printing functions of the printer 2. The setting may be a process of setting the name of the printer 2, setting of an electronic mail address for the case where the printer 2 sends and receives data via electronic mail, setting optional parts attached to the printer 2, and so on.

The initial setup user interface 6 illustrated in FIGS. 4 to 6 are exemplary and may include the UI background section 60 that is larger in lateral size than the touch panel 11. Additionally, the UI background section 60 may not be in a fixed state, and the UI background section 60 may change in accordance with the display style of the initial setup user interface 6. The user interface 6a and the user interface 6b may include different UI background sections 60.

At least some of the functional blocks illustrated in FIG. 2 may be implemented by hardware or may be implemented by hardware and software cooperating with each other. The program 18 may be stored in an external storage device coupled to the terminal device 1.

The processing units in the sequence diagram in FIG. 3 and in the flowchart in FIG. 7 are units into which the operations of the components of the printing system 100 are divided in accordance with the main processing content for ease of understanding. The embodiments are not limited by how to divide the processing units and the names, and the operations of the components of the printing system 100 may be divided into a larger number of processing units and may also be divided such that one processing unit includes a larger number of processing units. The processing orders illustrated in FIG. 3 and FIG. 7 are exemplary, and the order of some of the process operations may be rearranged.

What is claimed is:

1. A method for performing an initial setup of an image processing apparatus by using a setting image displayed on a terminal device, the method comprising:
   connecting to the image processing apparatus via a direct wireless communication channel;
   obtaining model information from the image processing apparatus over the direct wireless communication channel prior to the image processing apparatus being initially setup;
   after obtaining the model information, providing the model information to a server and receiving from the server an initial setup image that corresponds to the model information;
   displaying, in a chat style in the initial setup image, a plurality of information logs regarding the initial setup of the image processing apparatus, an instruction information log regarding instruction information including an instruction for a user who operates the image processing apparatus, and a response log regarding a user response input by the user in response to the instruction information instructing the user regarding at least one of an operation of removing a protection tape attached to a printer, an operation of attaching an option unit, an attachment operation, an ink filling operation of an ink cartridge, an operation of loading paper sheets as a printing medium, and an operation of installing the printer;
   transmitting the model information and a progress of the initial setup to the server; and
   receiving an updated setup image from the server based on the model information and the progress of the initial setup,
   wherein the setting image is generated based on the model information obtained from the image processing apparatus.

2. The method according to claim 1, further comprising:
   receiving an operation performed by the user;

in response to receiving a first operation while displaying one information log of the plurality of information logs arranged in the initial setup image, providing display in which the one information log moves in a first direction; and in response to receiving a second operation while displaying the instruction information log, providing display in which the instruction information log moves in the first direction.

3. The method according to claim 2, further comprising displaying the plurality of information logs consecutively in the first direction.

4. The method according to claim 2, wherein the one information log includes an image.

5. The method according to claim 2, wherein the one information log includes information about an operation that the user performs for the image processing apparatus in installing the image processing apparatus.

6. The method according to claim 2,
wherein the instruction information log includes an image of a response request including first option and a second option, and
the method further comprises
displaying the response log in which the first option is the user response, when receiving an operation of selecting the first option after displaying the image of the response request.

7. The method according to claim 2, wherein the first operation is scrolling that provides an instruction for scroll of the initial setup image, and the second operation is touching a display surface of the terminal device.

8. The method according to claim 2, further comprising
in response to receiving, by using the terminal device, scrolling in a second direction opposite to the first direction, providing display in which the plurality of information logs moves in the second direction.

9. The method according to claim 1, wherein the initial setup image includes information, which corresponds to the model information and has display objects of characters and images to be displayed by the terminal device and data specifying a display order and display positions of the display objects.

10. A non-transitory computer-readable storage medium storing a program that, when executed by a terminal device that displays an initial setup image for initial setup of an image processing apparatus, causes the terminal device to:
connect to the image processing apparatus via direct wireless communication channel;
obtain model information from the image processing apparatus over the direct wireless communication channel prior to the image processing apparatus being initially setup;
after obtaining the model information, providing the model information to a server and receiving from the server an initial setup image that corresponds to the model information;
display, in a chat style in the initial setup image, a plurality of information logs regarding the initial setup of the image processing apparatus, an instruction information log regarding instruction information including an instruction for a user who operates the image processing apparatus, and a response log regarding a user response input by the user in response to the instruction information, the instruction for the user instructing the user regarding at least one of an operation of removing a protection tape attached to a printer, an operation of attaching an option unit, an attachment operation and an ink filling operation of an ink cartridge, an operation of loading paper sheets as a printing medium, and an operation of installing the printer;
transmit the model information and a progress of the initial setup to the server; and
receive an updated setup image from the server based on the model information and the progress of the initial setup,
wherein the initial setup image is generated based on the model information obtained from the image processing apparatus.

11. The non-transitory computer-readable storage medium according to claim 10, wherein the terminal device is further caused to:
receive an operation performed by the user;
in response to receiving a first operation while displaying one information log of the plurality of information logs arranged in the initial setup image, provide display in which the one information log moves in a first direction; and
in response to receiving a second operation while displaying the instruction information log, provide display in which the instruction information log moves in the first direction.

12. The non-transitory computer-readable storage medium according to claim 11, wherein the terminal device is further caused to:
display the plurality of information logs consecutively in the first direction.

13. The non-transitory computer-readable storage medium according to claim 11, wherein the one information log includes an image.

14. The non-transitory computer-readable storage medium according to claim 11, wherein the one information log includes information about an operation that the user performs for the image processing apparatus in installing the image processing apparatus.

15. The non-transitory computer-readable storage medium according to claim 11,
wherein the instruction information log includes an image of a response request including first option and a second option, and
the terminal device is further caused to:
display the response log in which the first option is the user response, when receiving an operation of selecting the first option after displaying the image of the response request.

16. The non-transitory computer-readable storage medium according to claim 11, wherein the first operation is scrolling that provides an instruction for scroll of the initial setup image, and the second operation is touching a display surface of the terminal device.

17. The non-transitory computer-readable storage medium according to claim 11, wherein the terminal device is further caused to:
in response to receiving, by using the terminal device, scroll in a second direction opposite to the first direction, providing display in which the plurality of information logs move in the second direction.

18. An image processing system comprising:
an image processing apparatus that processes image data; and
a terminal device that performs initial setup of the image processing apparatus, the terminal device being configured to:
connect to the image processing apparatus via a direct wireless communication channel;

obtain model information from the image processing apparatus over the direct wireless communication channel prior to the image processing apparatus being initially setup;

after obtaining the model information, provide the model information to a server and receive from the server an initial setup image that corresponds to the model information;

display an initial setup image for initial setup of the image processing apparatus;

display, in a chat style in a setting image, a plurality of information logs regarding initial setup of the image processing apparatus, an instruction information log regarding instruction information including an instruction for a user who operates the image processing apparatus, and a response log regarding a user response input by the user in response to the instruction information, wherein the initial setup image is generated based on the model information obtained from the image processing apparatus, the instruction for the user instructing the user regarding at least one of an operation of removing a protection tape attached to a printer, an operation of attaching an option unit, an attachment operation and an ink filling operation of an ink cartridge, an operation of loading paper sheets as a printing medium, and an operation of installing the printer;

receive input of the user response;

in response to the input of the user response, transmit, to the image processing apparatus, initial setup information based on an instruction provided for the user response;

transmit the model information and a progress of the initial setup to the server; and receive an updated setup image from the server based on the model information and the progress of the initial setup, wherein the image processing apparatus is configured to receive the initial setup information from the terminal device and set a function of the image processing apparatus based on the initial setup information.

19. The image processing system according to claim 18, wherein the terminal device is further configured to receive an operation performed by the user;

in response to receiving a first operation while displaying one information log of the plurality of information logs arranged in the initial setup image, provide display in which the one information log moves in a first direction; and in response to receiving a second operation while displaying the instruction information log, provide display in which the instruction information log moves in the first direction.

20. The image processing system according to claim 19, wherein the terminal device is further configured to display the plurality of information logs consecutively in the first direction in the initial setup image.

21. The image processing system according to claim 19, wherein the one information log includes an image.

* * * * *